(12) United States Patent
Hitt et al.

(10) Patent No.: US 6,910,681 B1
(45) Date of Patent: Jun. 28, 2005

(54) RETAINING U-BOLTS TO A TUBULAR AXLE HOUSING

(75) Inventors: Brian James Hitt, Hartford, WI (US); Michael Bedis, Oconomowoc, WI (US); Rocky Hudson Page, York, SC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/777,964

(22) Filed: Feb. 12, 2004

(51) Int. Cl.[7] .............................. B60G 11/02; F16F 1/18
(52) U.S. Cl. ........................................................ 267/52
(58) Field of Search .......................... 267/52, 264, 271, 267/36.1, 31

(56) References Cited

U.S. PATENT DOCUMENTS

| | | | |
|---|---|---|---|
| 2,745,661 A * | 5/1956 | Van Raden .................. 267/52 |
| 3,749,196 A | 7/1973 | Traylor ........................ 180/85 |
| 3,913,937 A * | 10/1975 | Longworth et al. ......... 280/680 |
| 3,970,166 A * | 7/1976 | Sheppard .................... 180/400 |
| 4,148,374 A * | 4/1979 | Sheppard .................... 180/400 |
| 4,227,716 A | 10/1980 | Nordstrom ................ 280/104.5 |
| 4,371,190 A | 2/1983 | Vandenberg ................. 280/705 |
| 4,452,435 A * | 6/1984 | Shinbori et al. ............ 267/214 |
| 4,598,900 A | 7/1986 | Yamamoto et al. ........... 267/52 |
| 4,611,793 A | 9/1986 | Nishiyama ................... 267/52 |
| 4,637,595 A | 1/1987 | Mishima et al. .............. 267/52 |
| 5,634,656 A * | 6/1997 | Banks ...................... 280/86.75 |
| 5,921,570 A * | 7/1999 | Lie ....................... 280/124.175 |
| 5,971,654 A * | 10/1999 | Sweeney, Jr. ............... 403/400 |
| 6,352,245 B1 * | 3/2002 | Norden ...................... 267/36.1 |
| 6,616,162 B2 * | 9/2003 | Machens et al. ...... 280/124.175 |

* cited by examiner

Primary Examiner—Robert A. Siconolfi
Assistant Examiner—Devon Kramer

(57) ABSTRACT

A tubular axle housing is provided with pairs of tabs that protrude or extend from the axle to a height or length sufficient to prevent the intermediate section of a U-bolt from sliding over the tab. The tabs also help locate and guide the U-bolt between the tabs during the assembly of a leaf spring to the axle housing. The tabs provide a positive locking feature for the U-bolts during service of a vehicle, to prevent the U-bolts from moving laterally along the axis of the axle tube. As a result, the joint between the leaf spring and axle housing is more secure.

12 Claims, 2 Drawing Sheets

RETAINING U-BOLTS TO A TUBULAR AXLE HOUSING

FIELD OF THE INVENTION

The present invention relates generally to leaf spring suspensions for small motor vehicles such as utility vehicles, all terrain vehicles and other vehicles that carry passengers and/or cargo. More specifically, the invention relates to retaining U-bolts that connect a leaf spring to a tubular axle housing.

BACKGROUND OF THE INVENTION

Utility vehicles such as Gator™ utility vehicles available from Deere and Company of Moline, Ill., may use leaf spring suspension of the vehicle over an axle. Opposing ends of a leaf spring may be pivotally connected to the vehicle frame, and the intermediate section of the leaf spring may be attached to a tubular axle housing with a pair of U-bolts.

Proper assembly of U-bolts to the tubular axle housing is critical to achieve long durability and proper function of the leaf spring suspension. Each U-bolt must be torqued correctly and must be assembled so that the U-bolt is perpendicular to the axis of the axle. If the U-bolts are allowed to deviate from perpendicular alignment with respect to the axle axis, the U-bolt may become loose, which may adversely and severely detract from the performance and durability of the leaf spring suspension.

In operation of a vehicle, the U-bolt may move from side-to-side along the axis of the axle housing, and may jeopardize the integrity of the connection between the axle housing and leaf spring. An apparatus and method are needed to prevent movement of the U-bolt with respect to the axis. It also is desirable to provide a guide for positioning the U-bolts during the assembly process of a leaf spring to an axle housing.

SUMMARY OF THE INVENTION

A tubular axle housing is provided with pairs of tabs that extend from the housing perpendicular to the axis of the axle. The tabs are dimensioned and shaped to trap the intermediate portion or section of a U-bolt that holds a leaf spring to the axle housing. The tabs block or prevent lateral movement of the U-bolt with respect to the axle housing.

Each tab may protrude or extend from the axle to a height or length sufficient to prevent the intermediate section of the U-bolt from sliding over the tab. The tabs retain each U-bolt so that it stays perpendicular to the axle housing during assembly and in service. Each tab may have any shape that will adequately restrain U-bolt movement along the axle housing. The sides of each tab may be sloped in a manner to help locate and guide a U-bolt between the tabs during the assembly process.

DESCRIPTION OF THE PREFERRED EMBODIMENT

Figure 1:
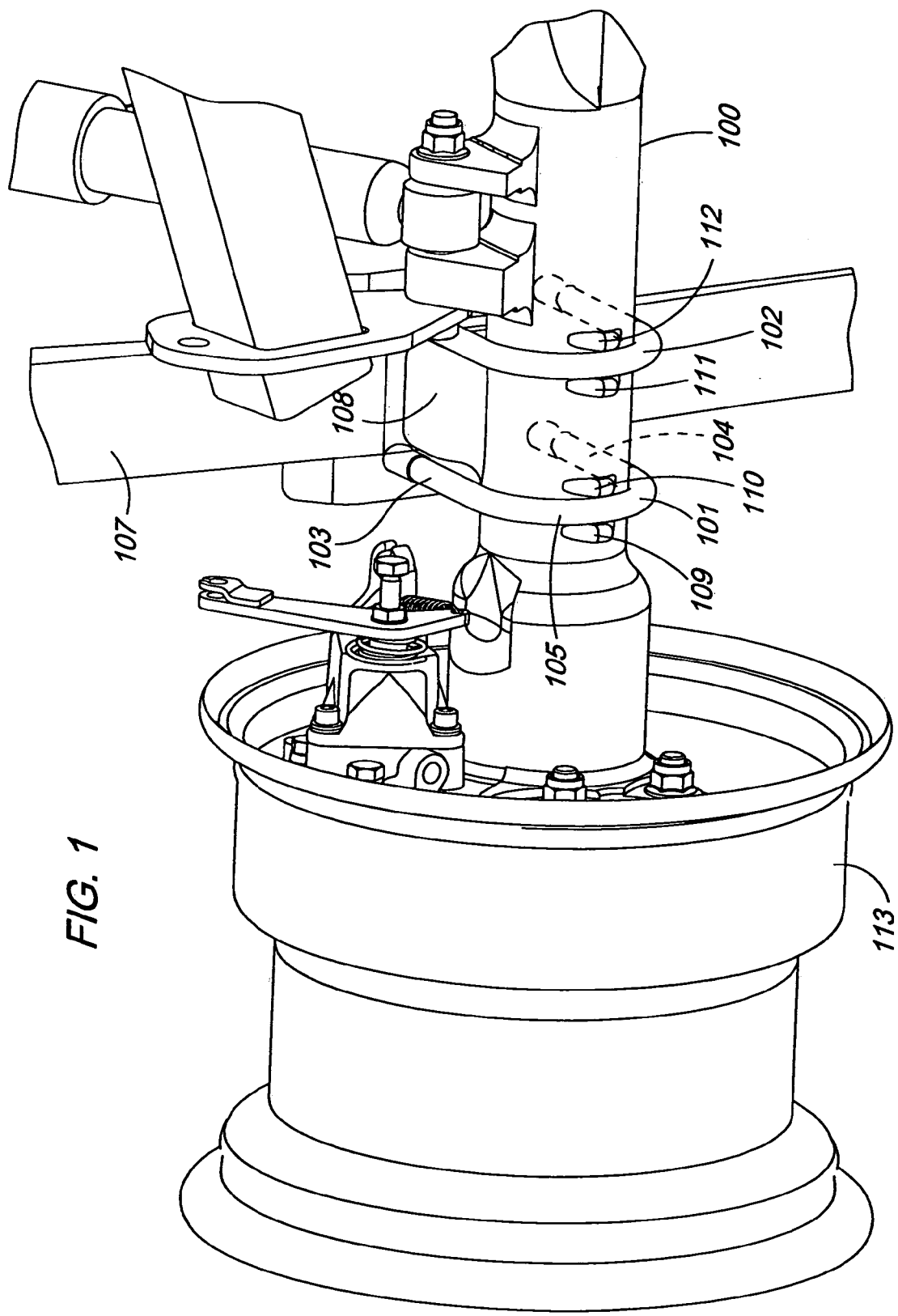
FIG. 1 is a perspective view of a pair of U-bolts connecting an axle housing to a leaf spring in a first embodiment of the invention.
Figure 2:
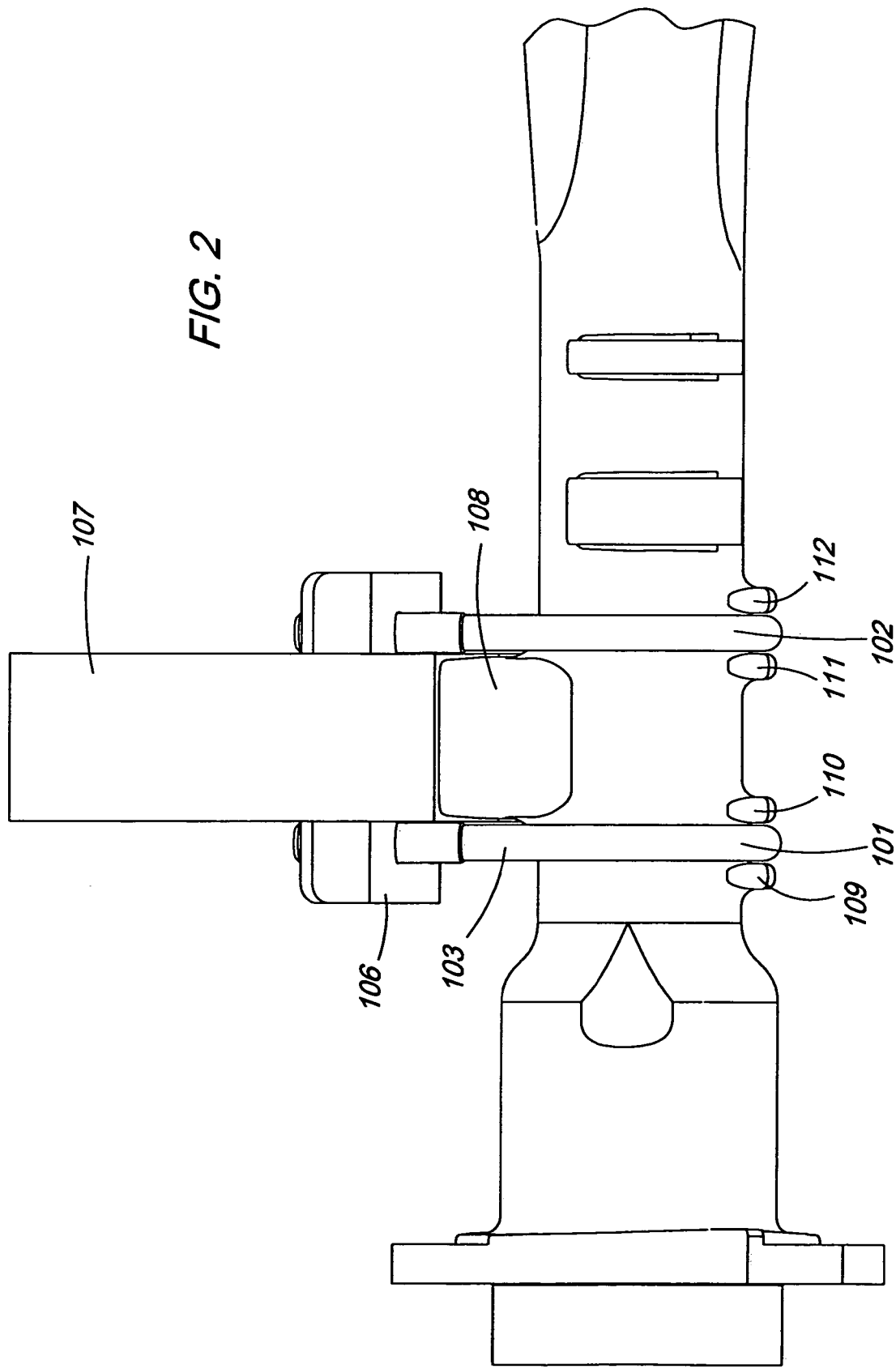
FIG. 2 is a side view of a pair of U-bolts connecting an axle housing to a leaf spring according to the first embodiment.

As shown in FIGS. 1 and 2, U-bolts 101, 102 are positioned to extend around axle housing 100 of a utility vehicle. The axle housing may have a generally tubular or cylindrical outer surface, an axis, and one end of the axle may be operably connected to wheel 113. Each U-bolt has two externally threaded ends 103, 104 and an intermediate portion or section 105 that forms an arc around the axle housing.

The externally threaded ends of either or both U-bolts may be fastened and tightened to leaf spring 107. In one embodiment, internally threaded fasteners may be used to tighten the ends of the U-bolts to plate 106, which holds leaf spring 107 to the axle housing. The leaf spring, which has opposing ends pivotally connected to a vehicle frame member (not shown) may be a single leaf spring, dual leaf spring, or multiple leaf spring. The leaf spring is positioned generally perpendicular to the axle housing, and may be over the axle housing. Spring retaining seat 108 also may be held between the leaf spring and the axle housing. The spring retaining seat may have a surface that conforms to the surface of the axle housing.

Axle housing 100 is provided with a first pair of tabs 109, 110, and a second pair of tabs 111, 112. The tabs are integral with the axle housing and in one embodiment may be cast into the axle housing. The tabs extend from the housing in an orientation that is perpendicular to the axis of the axle. Tabs 109, 110 are configured and spaced to trap the intermediate portion or section of U-bolt 101 and block or prevent lateral movement of the U-bolt with respect to the axle housing. Similarly, tabs 111, 112 are configured and spaced to trap the intermediate portion or section of U-bolt 102, and prevent or block lateral movement of the U-bolt with respect to the axle housing.

Each pair of tabs may be spaced so that at least a portion of the U-bolt, preferably the intermediate portion, may be positioned therebetween during assembly. For example, the spacing between each pair of tabs may be between about ¼ inch and 1 inch, depending on the diameter of the U-bolt.

Each tab may protrude or extend from the axle to a height or length sufficient to prevent the intermediate section of the U-bolt from sliding over the tab, or otherwise moving laterally with respect to the axle housing. The tabs should retain the U-bolt so that the U-bolt remains perpendicular to the axle housing during assembly and in service. Each tab may have any shape that will adequately restrain U-bolt movement along the axis of the axle housing. In one embodiment, the sides of each tab may be sloped in a manner to help locate and guide a U-bolt between the tabs during the assembly process.

Thus, in one embodiment of the invention, each pair of tabs provides a guide to locating a U-bolt during assembly of a leaf spring to an axle housing. The tabs provide a positive locking feature for the U-bolts during service of the vehicle, to prevent the U-bolts from moving laterally along the axis of the axle tube. As a result, the joint between the leaf spring and axle housing is more secure.

Having described a preferred embodiment, it will become apparent that various modifications can be made without departing from the scope of the invention as defined in the accompanying claims.

What is claimed is:

1. An apparatus comprising:
   an axle housing having a generally tubular outer surface and an axis;
   a leaf spring positionable perpendicular to the axis of the axle housing;
   a pair of U-bolts, each U-bolt having an intermediate portion forming an arc around the axle housing, and having first and second ends operably connected to the leaf spring; and
   two pairs of tabs integral with the axle housing, the intermediate portion of each U-bolt positioned between one pair of the tabs.

2. The apparatus of claim 1 further comprising a spring retaining seat between the axle housing and the leaf spring.

3. The apparatus of claim 1 wherein the two pairs of tabs are cast into the axle housing.

4. The apparatus of claim 1 wherein the two pairs of tabs extend in a direction perpendicular from the axle housing.

5. The apparatus of claim 1 wherein the leaf spring is a single leaf spring.

6. A method comprising:
   casting a pair of tabs into an axle housing, the axle housing having an axis, each of the pair of tabs extending perpendicular from the axis;
   positioning an intermediate portion of a U-bolt between the pair of tabs.

7. The method of claim 6 further comprising positioning a spring retaining seat between the axle housing and a leaf spring.

8. The method of claim 6 further comprising casting a second pair of tabs into the axle housing, each of the second pair of tabs extending perpendicular from the axis.

9. The method of claim 6 wherein the U-bolt has a pair of ends fastened to a plate.

10. An apparatus comprising:
    a generally cylindrical axle housing;
    a spring retaining seat over the axle housing;
    a leaf spring over the spring retaining seat;
    a plate over the axle housing;
    a pair of U-bolts extending around the axle housing and having first and second ends tightenable to the plate; and
    two pairs of tabs extending from the axle housing, a portion of each U-bolt positionable between one pair of the tabs.

11. The apparatus of claim 10 wherein the tabs are integral with the axle housing.

12. The apparatus of claim 10 wherein the tabs have sloped surfaces.

* * * * *